(12) United States Patent
Braun et al.

(10) Patent No.: US 7,709,984 B2
(45) Date of Patent: May 4, 2010

(54) DEVICE FOR DETERMINING A SHAFT CENTER DEVIATION

(75) Inventors: Matthias Braun, Weichtungen (DE); Rolf Vollmer, Gersfeld (DE)

(73) Assignee: Siemens Aktiengesellschaft, Munich (DE)

( * ) Notice: Subject to any disclaimer, the term of this patent is extended or adjusted under 35 U.S.C. 154(b) by 295 days.

(21) Appl. No.: 11/994,029

(22) PCT Filed: Jun. 28, 2006

(86) PCT No.: PCT/EP2006/063642

§ 371 (c)(1), (2), (4) Date: Dec. 27, 2007

(87) PCT Pub. No.: WO2007/003547

PCT Pub. Date: Jan. 11, 2007

(65) Prior Publication Data

US 2008/0164777 A1    Jul. 10, 2008

(30) Foreign Application Priority Data

Jul. 1, 2005   (DE) ................... 10 2005 030 878

(51) Int. Cl.
*H02K 7/09* (2006.01)
(52) U.S. Cl. .................................. 310/90.5; 310/68 B
(58) Field of Classification Search ............... 310/90.5, 310/68 B; 324/207.17, 207.25; 318/479, 318/504, 400.34
See application file for complete search history.

(56) References Cited

U.S. PATENT DOCUMENTS

| 5,936,370 | A | * | 8/1999 | Fukao et al. ................. 318/652 |
| 6,130,494 | A | | 10/2000 | Schob |
| 6,849,979 | B2 | * | 2/2005 | Brunet et al. ............... 310/90.5 |

FOREIGN PATENT DOCUMENTS

| DE | 195 29 038 A1 | 2/1997 |
| DE | 69630 986 T2 | 10/2004 |
| EP | 0 920 109 A2 | 6/1999 |
| EP | 0 939 480 A2 | 9/1999 |
| GB | 1 478 868 | 11/1974 |

\* cited by examiner

*Primary Examiner*—Quyen Leung
*Assistant Examiner*—Eric Johnson
(74) *Attorney, Agent, or Firm*—Henry M. Feiereisen; Ursula B. Day

(57) ABSTRACT

The invention relates to a device for determining the center deviation of a shaft (3) comprising a stator (1) in which an exciting winding system provided with a number of Perr pole pairs is arranged and two output winding systems provided with respective number of Paus pole pairs, wherein the output winding systems are remotely arranged with respect to each other in the stator, the shaft (3) is movably placed in the stator (1) in such a way that it makes it possible to display the shaft center deviation, when |Perr−Paus|=1, an air gap is situated between the stator (1) and the shaft (3), the device voltage source is arranged for supplying the exciting winding system with an alternating voltage and the device output evaluation system is provided for determining the center deviation according to the voltage induced by the output winding systems.

15 Claims, 3 Drawing Sheets

| | 9 | | 10 | | 11 |
|---|---|---|---|---|---|
| 0 | | 0 | | 1000 | |
| 707 | | 924 | | 383 | |
| 1000 | | 707 | | -707 | |
| 707 | | -383 | | -924 | |
| 0 | | -1000 | | 0 | |
| -707 | | -383 | | 924 | |
| -1000 | | 707 | | 707 | |
| -707 | | 924 | | -383 | |
| 0 | | 0 | | -1000 | |
| 707 | | -924 | | -383 | |
| 1000 | | -707 | | 707 | |
| 707 | | 383 | | 924 | |
| 0 | | 1000 | | 0 | |
| -707 | | 383 | | -924 | |
| -1000 | | -707 | | -707 | |
| -707 | | -924 | | 383 | |

DEVICE FOR DETERMINING A SHAFT CENTER DEVIATION

BACKGROUND OF THE INVENTION

The invention relates to a device for determining a shaft center deviation and to a method for determining a shaft center deviation.

Magnetic bearings can be subdivided into passive magnetic bearings and active magnetic bearings. In the case of passive magnetic bearings, use is either made of the repelling or attracting forces which occur between permanent magnets or of the attraction forces between permanent magnets and ferromagnetic materials. In the case of active magnetic bearings, the magnetic field required is generated with the aid of electromagnets. The magnetic field and thus the currently acting forces can be changed by varying the current in the coils of the electromagnets. In order to be able to mount a machine part in such a manner, a control operation which ensures that the currently required bearing forces are available is always required. The controlled variable is the center deviation of the part to be mounted or of the shaft to be mounted. This position is measured in a contactless manner using a sensor.

It is known practice to configure the sensor in such a manner that it comprises a stator into which an excitation winding system is inserted, said winding system being fed with an AC voltage. Part of the shaft to be mounted projects into the stator. Hall sensors introduced into the stator measure the magnetic field and use it to determine the shaft center deviation.

However, the disadvantage is that the Hall sensors are difficult to manufacture and are therefore expensive and that a zero point adjustment operation must take place before the sensor is started. However, under certain circumstances, the zero point adjustment operation must be repeated after a certain operating time since the material of the sensor ages. Accordingly, the use of Hall sensors also results in inaccuracies when determining the shaft center deviation.

SUMMARY OF THE INVENTION

Therefore, the invention is based on the object of specifying a device for determining a shaft center deviation which makes it possible to determine a shaft center deviation in a more cost-effective and accurate manner.

According to the invention, this object is achieved by means of a device for determining a shaft center deviation with a stationary stator containing an excitation winding system, which has the number of pole pairs Perr, and two output winding systems, each having the number of pole pairs Paus,
  the output winding systems being arranged in the stator in such a manner that they are offset with respect to one another,
  the shaft being arranged in the stator such that it can be moved, with the result that it may have a center deviation,
  |Perr−Paus|=1,
  an air gap being situated between the stator and the shaft,
  the device being assigned a voltage source which feeds AC voltage to the excitation winding system,
  the device being assigned an evaluation device which determines the shaft center deviation from the voltages induced in the output winding systems.

As a result, the device can advantageously be produced in a cost-effective manner and has a very high level of accuracy. Furthermore, there is no need for a zero point adjustment operation and aging of the material does not influence the measurement accuracy. In this case, |Perr−Paus|=1 means that Perr and Paus differ by precisely 1. In this case, the shaft must be at least as long as the stator and may be fastened, at least one end, to further elements or may merge into further elements. In this case, the elements may be made from a different material and may have a different shape.

The stator is either constructed from insulated laminates or from a ferromagnetic material having a high electrical resistance. This advantageously ensures that eddy currents which would lower the performance of the device scarcely occur. A material which is ferromagnetic and has a high electrical resistance is sintered material, for example.

At least one winding system may comprise air-gap windings. In this case, the windings are not placed around teeth of the stator and, under certain circumstances, the stator does not have any teeth either in this case. This is particularly advantageous if the intention is to mount a large number of conductors in the stator.

Alternatively, the stator has N slots into which the winding systems are inserted. It is then advantageously possible to place the windings of the winding systems around the teeth of the stator and thus to have a positive effect on the magnetic field in the stator. If the stator has N slots, the output winding systems are arranged in such a manner that they are offset by N/(Paus*4) or N*3/(Paus*4) slots. The center deviation can thus be calculated from the voltage induced in the output winding systems. For this purpose, each output winding system has at least two connections at which the induced voltages U1 and U2 can be measured.

The evaluation device advantageously has a means which determines the shaft deviation from the center of the stator from a first constant multiplied by the root of the sum of the squares of the two voltages U1 and U2 induced in the output winding systems. The relationship can be expressed as follows:

$$\text{Shaft deviation} = \text{constant1} \cdot \sqrt{U1^2 + U2^2}.$$

Furthermore, the evaluation device has a means which determines the angle of the deviation from the center position, measured from a reference line which runs through the center of the stator, from a second constant to which the arc tangent of the ratio of the two induced voltages U1 and U2 is added. The relationship can be expressed as follows:

$$\text{Angle of the deviation} = constant2 + \arctan\left(\frac{U1}{U2}\right).$$

The inventive device can also be advantageously used if the shaft is rotatably mounted.

The device may be assigned a control device which drives windings of a magnetic bearing. The device then measures the control error, which corresponds to a shaft center deviation, and forwards the data to the control device which then drives the windings of the magnetic bearing in order to move the shaft to a particular point, for example the center of the bearing.

Furthermore, the device for determining a shaft center deviation is assigned a display which displays the measured center deviation. The device can thus also be advantageously used as a mobile measuring unit. In this case, the display may be designed in analog or digital fashion as an LCD display.

The device for determining a shaft center deviation advantageously has a connection option which can be used to transmit the measured center deviation to a further device. In this case, the further device may be, for example, a display, a recording device or a closed-loop or open-loop control device. In this case, a recording device would concomitantly log the center deviations.

BRIEF DESCRIPTION OF THE DRAWING

The invention and further advantageous refinements of the invention according to the features of the subclaims are explained in more detail below using diagrammatically illustrated exemplary embodiments in the drawing, without this restricting the invention to this exemplary embodiment; in the drawing:

DETAILED DESCRIPTION OF PREFERRED EMBODIMENTS

Figure 1:
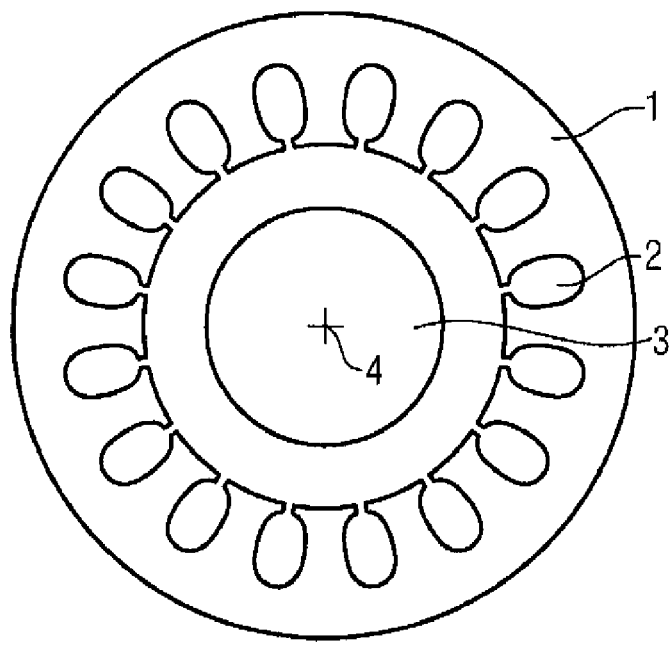
FIG. 1 shows the stator of the inventive device with a central shaft.

FIG. 1 shows a stator 1 of the inventive device with a central shaft 3. The stator 1 has slots 2 into which the excitation winding system and the output winding systems are inserted. In this example, the shaft 4 is situated in the center of the stator 1, that is to say the center of the shaft is precisely in the center 4 of the stator.

Figure 2:
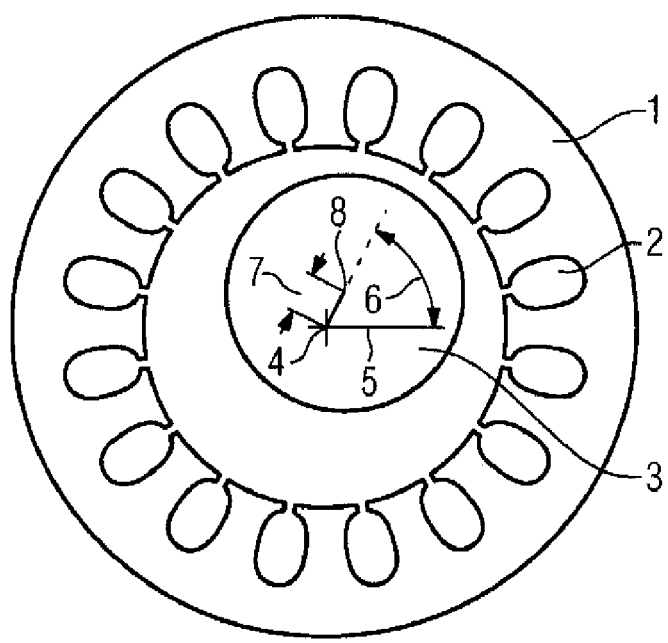
FIG. 2 shows the stator of the inventive device with a shaft which is not central.

FIG. 2 shows the stator 1 of the inventive device with a shaft 3 which is not central. In this example, the center 8 of the shaft 3 is situated beside the center 4 of the stator. The shaft 3 center deviation can be expressed by the deviation 7 from point 4 to point 8 and by the angle 6 of the deviation 7 of the stator, measured from a reference line 5 which runs through the center 4 of the stator.

The inventive device determines the deviation 7 and the angle 6 and thus the center deviation of the shaft 3 in the stator 1. This is effected by feeding an AC voltage at a frequency of, for example, 2 to 10 kHz to the excitation winding system. The voltages induced in the output winding systems are influenced by the position of the shaft 3 in the stator 1.

The shaft 3 deviation 7 from the center 4 of the stator 1 then results from a constant multiplied by the root of the sum of the squares of the two voltages U1 and U2 induced in the output winding systems.

The angle 6 results from a constant to which the arc tangent of the ratio of the two induced voltages U1 and U2 is added.

Figures 3, 4:
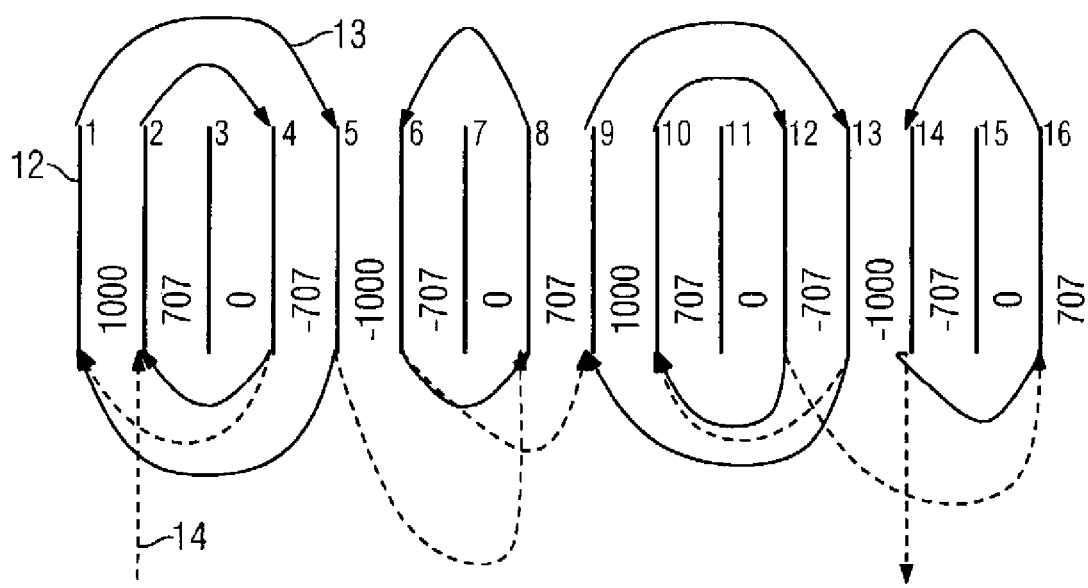
FIG. 3 shows an allocation plan for the slots.
FIG. 4 shows the wiring of the output winding system.

FIG. 3 shows the allocation plan for the slots 2. In the present example, the number of slots 2 in the stator 1 is N=16. Column 9 shows the allocation plan for the excitation winding system and columns 10 and 11 show the allocation plan for the two output winding systems. Each row represents one of the N=16 slots 2. Each digit indicates the number of conductors in the corresponding slot 2 and the mathematical signs indicate the direction in which current flows through. In the present example, the number of pole pairs of the excitation winding system is Perr=2. The two output winding systems respectively have the number of pole pairs Paus=3. Accordingly, |Perr−Paus|=1. It can also be seen that the output winding systems are identical and are arranged in such a manner that they are offset by N*3/(Paus*4) slots.

FIG. 4 shows, by way of example, the wiring of the excitation winding system. Each line 12 represents a slot 2. Solid lines are used to symbolize the coils 13 of the winding system and dashed lines are used to mark the connections 14 between the coils.

Figure 5:
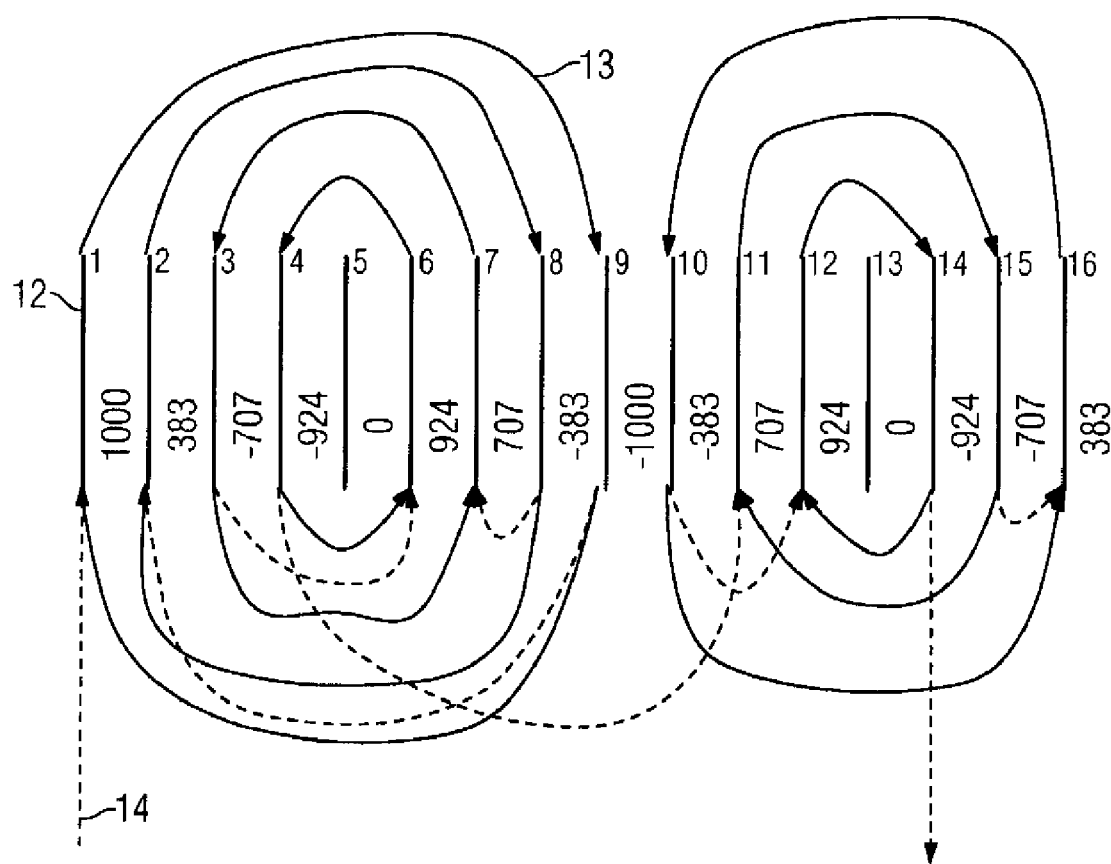
FIG. 5 shows the wiring of the first excitation winding system.

FIG. 5 shows, by way of example, the wiring of the output winding system. Each line 12 represents a slot 2. Solid lines are used to show the coils 13 of the winding system and dashed lines are used to mark the connections 14 between the coils.

What is claimed is:

1. A device for determining an excursion of a movable shaft from a center of a stationary stator, comprising:
an excitation winding system disposed on the stator with a number of pole pairs Perr, and two mutually offset output winding systems, each of the output winding systems having a number of pole pairs Paus and at least two terminals, with |Perr−Paus|=1, wherein the shaft is spaced from the stator by an air gap,
a voltage source supplying an AC voltage to the excitation winding system, and
an evaluation device which measures two voltages induced at the at least two terminals of the output winding systems and determining the shaft excursion from the center according to the following equation:

$$\text{Shaft excursion} = \text{constant1} \cdot \sqrt{U1^2 + U2^2},$$

wherein constant1 is a first constant and U1 and U2 are the voltages induced at the at least two terminals of the two mutually offset output winding systems.

2. The device of claim 1, wherein the stator is constructed from sheet metal laminates.

3. The device of claim 1, wherein the stator is formed from ferromagnetic material having a high electrical resistance.

4. The device of claim 3, wherein the ferromagnetic material is a sintered material.

5. The device of claim 1, wherein at least one of the excitation winding system and the two output winding systems comprises air-gap windings.

6. The device of claim 1, wherein the stator has N slots into which the winding systems are inserted.

7. The device of claim 6, wherein the output winding systems are mutually offset by N/(Paus*4) or N*3/(Paus*4) slots.

8. The device of claim 1, wherein the evaluation device is configured to determine an angle of the excursion from the center of the stator with reference to a reference line which runs through the center of the stator, according to the equation $$\text{Angle of the deviation} = constant2 + \arctan\left(\frac{U1}{U2}\right),$$

wherein constant2 is a second constant and U1 and U2 are the voltages induced at the at least two terminals of the two mutually offset output winding systems.

9. The device of claim 1, wherein the shaft is rotatably mounted in the stationary stator.

10. The device of claim 9, wherein the shaft is mounted in magnetic bearings, the device further comprising a control device which controls windings of the magnetic bearings.

11. The device of claim 1, further comprising a display which displays the measured excursion from the center.

12. The device of claim 1, further comprising a connection adapted to transmit the determined excursion from the center to an additional device.

13. The device of claim 12, wherein the additional device is selected from the group consisting of a display, a recording device, a data logger, a closed-loop control device and open-loop control device.

14. A method for determining an excursion of a movable shaft from a center of a stationary stator, the stator having an excitation winding system disposed on the stator with a number of pole pairs Perr, and two mutually offset output winding systems, each of the output winding systems having a number of pole pairs Paus and two terminals, with |Perr−Paus|=1, wherein the shaft is spaced from the stator by an air gap, said method comprising the steps of:
  supplying an AC voltage to the excitation winding system,
  measuring an output voltage at the two terminals of the output winding systems, and
  determining the excursion from the center from the measured output voltages from the following equation $$\text{Shaft excursion} = constant1 \cdot \sqrt{U1^2 + U2^2},$$

wherein constant1 is a first constant and U1 and U2 are the voltages induced at the two terminals of the two mutually offset output winding systems.

15. The method of claim 14, further comprising the steps of determining an angle of the excursion from the center of the stator with reference to a reference line which runs through the center of the stator, according to the equation $$\text{Angle of the deviation} = constant2 + \arctan\left(\frac{U1}{U2}\right),$$

wherein constant2 is a second constant and U1 and U2 are the voltages induced at the at least two terminals of the two mutually offset output winding systems.

* * * * *